(12) United States Patent
Buck

(10) Patent No.: X9194
(45) Date of Patent: Oct. 27, 1835

(54) BOOTS, BOOTEES, &C. CUTTING THE UPPERS

(76) Inventor: Joseph T. Buck

Josiah T. Buck
Letters Patent

The schedule referred to in these Letters Patent and making part of the same containing a description in the words of the said Josiah T. Buck himself of his improvement in the art of cutting the uppers of Boots Bootees and high laced shoes

---

To all to whom these presents shall come. Be it known that I Josiah T. Buck of New Canaan in the County of Fairfield and State of Connecticut have invented a new and useful art or improvement in cutting uppers for Boots and Bootees and high laced shoes and that the following is a full and exact description thereof. To ascertain the size of the foot and leg the measure is taken as is now the practice. the measure is then laid on the leather or cloth on which the boots or shoes is intended to be cut from or designed to be cut out of or the measure put on the petron and cut according to the size. and in that case the petron is used instead of the measure, when the upper for a boot is cut out it is but one piece of Leather with a slit at the vamp and a projection for the top of the boot. making but one seam to close and that a circular seam running neer the fore part of the boot and inding at the bottom of the vamp near the fore part of the counter. Bootees cut in the same way or on the same principal only made shorter with a strap behind. And for a laced boot or a laced shoe the uppers are cut simular and left open to be laced, buckeled, hooked or buttoned on the side thereof.

Witnesses
B. A. Rousseau
Benj. Isaacs

Josiah T. Buck